United States Patent
Christmas et al.

(10) Patent No.: US 10,310,261 B2
(45) Date of Patent: Jun. 4, 2019

(54) IMAGING DEVICE FOR MOVING A VIRTUAL IMAGE

(71) Applicant: TWO TREES PHOTONICS LIMITED, Buckinghamshire (GB)

(72) Inventors: Jamieson Christmas, Buckinghamshire (GB); Dackson Masiyano, Buckinghamshire (GB); William Crossland, Harlow (GB)

(73) Assignee: TWO TREES PHOTONICS LIMITED, Buckinghamshire (GB)

( * ) Notice: Subject to any disclaimer, the term of this patent is extended or adjusted under 35 U.S.C. 154(b) by 0 days.

(21) Appl. No.: 15/311,442

(22) PCT Filed: May 13, 2015

(86) PCT No.: PCT/GB2015/051393
§ 371 (c)(1),
(2) Date: Nov. 15, 2016

(87) PCT Pub. No.: WO2015/173556
PCT Pub. Date: Nov. 19, 2015

(65) Prior Publication Data
US 2017/0082855 A1     Mar. 23, 2017

(30) Foreign Application Priority Data

May 16, 2014   (GB) .................................. 1408807.4

(51) Int. Cl.
*G03H 1/00*   (2006.01)
*G02B 27/01*   (2006.01)
(Continued)

(52) U.S. Cl.
CPC ..... *G02B 27/0103* (2013.01); *G02B 27/2278* (2013.01); *G03H 1/2294* (2013.01);
(Continued)

(58) Field of Classification Search
CPC ..................... G02B 27/0103; G02B 27/2278; G02B 27/01; G02B 27/22; G02B 2027/0105;
(Continued)

(56) References Cited

U.S. PATENT DOCUMENTS

| 2002/0113752 A1 | 8/2002 | Sullivan et al. |
| 2009/0034087 A1 | 2/2009 | Hung et al. |
| 2013/0082905 A1 | 4/2013 | Ranieri et al. |

FOREIGN PATENT DOCUMENTS

| GB | 2501112 A | 10/2013 |
| KR | 1020090023429 A | 3/2009 |

(Continued)

OTHER PUBLICATIONS

D. Coates et al., "Electrically induced scattering textures in smectic A phases and their electrical reversal," J. Phys. D: Appl. Phys., 11, 2025-2035 (1978).

(Continued)

*Primary Examiner* — Jade R Chwasz
*Assistant Examiner* — Jyotsna V Dabbi
(74) *Attorney, Agent, or Firm* — McDonnell Boehnen Hulbert & Berghoff LLP

(57) ABSTRACT

An imaging device includes a projection optic arranged to form a virtual image of an object. The imaging device further includes a first diffuser positioned a first distance from the virtual projection optic and a second diffuser positioned a second distance from the virtual projection optic. The controller is arranged to control the first and second diffuser to make the real image visible on one of the diffusers.

24 Claims, 7 Drawing Sheets

(51) Int. Cl.
*G02B 27/22* (2018.01)
*G03H 1/22* (2006.01)

(52) U.S. Cl.
CPC ............... *G02B 2027/0105* (2013.01); *G02B 2027/0109* (2013.01); *G03H 2001/2284* (2013.01)

(58) Field of Classification Search
CPC ......... G02B 2027/0109; G03H 1/2294; G03H 2001/2284; G02F 1/137; G06T 15/00; H04N 13/00; G09G 5/00
USPC ................................................ 359/13; 345/6
See application file for complete search history.

(56) References Cited

FOREIGN PATENT DOCUMENTS

| WO | WO-2007131650 A1 | 11/2007 |
| WO | WO-2010125367 A1 | 11/2010 |
| WO | WO-2013153354 A1 | 10/2013 |

OTHER PUBLICATIONS

D. Coates, "Polymer-dispersed Liquid Crystals," J. Mater. Chem. 5(12), 2063-2072 (1995).
W. Greubel et al., "Electric Field Induced Texture Changes in Certain Nematic/Cholesteric Liquid Crystal Mixtures," Molecular Crystals and Liquid Crystals, 24, 103-111 (1973).
V.G. Chigrinov, "Liquid Crystal Devices—Physics and Applications," Section 2.4, 134-148 (1999).
"Great Britain Application Serial No. 1408807.4, Search and Examination Report dated Nov. 19, 2014", 5 pgs.
"International Application No. PCT/GB2015/051393, International Search Report dated Jul. 22, 2015", 5 pgs.
"International Application No. PCT/GB2015/051393, Written Opinion dated Jul. 22, 2015", 8 pgs.
Sullivan, Alan, "A Solid-state Multi-planar Volumetric Display", (2003), 1531-1533.

IMAGING DEVICE FOR MOVING A VIRTUAL IMAGE

FIELD OF THE INVENTION

This application is a U.S. National Stage Filing under 35 U.S.C. 371 from International Application No. PCT/GB2015/051393, filed on May 13, 2015, and published as WO 2015/173556 A1 on Nov. 19, 2015, which claimed priority to GB Patent Application No. 1408807.4, filed on May 16, 2014, both of which are incorporated herein by reference in their entireties. The present disclosure relates to the field of imaging. More specifically, the present disclosure relates to the field of virtual imaging. The present disclosure also relate to the field of head-up displays and viewing systems for head-up displays.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The "hologram" may be reconstructed by illuminating it with suitable light to form a holographic reconstruction, or replay image, representative of the original object.

It has been found that a holographic reconstruction of acceptable quality can be formed from a "hologram" containing only phase information related to the original object. Such holographic recordings may be referred to as phase-only holograms. Computer-generated holography may numerically simulate the interference process, using Fourier techniques for example, to produce a computer-generated phase-only hologram. A computer-generated phase-only hologram may be used to produce a holographic reconstruction representative of an object.

The term "hologram" therefore relates to the recording which contains information about the object and which can be used to form a reconstruction representative of the object. The hologram may contain information about the object in the frequency, or Fourier, domain.

It has been proposed to use holographic techniques in a two-dimensional image projection system. An advantage of projecting images using phase-only holograms is the ability to control many image attributes via the computation method—e.g. the aspect ratio, resolution, contrast and dynamic range of the projected image. A further advantage of phase-only holograms is that no optical energy is lost by way of amplitude modulation.

A computer-generated phase-only hologram may be "pixellated". That is, the phase-only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal spatial light modulator (SLM). The SLM may be reflective meaning that modulated light is output from the SLM in reflection.

Each phase modulating element, or pixel, may vary in state to provide a controllable phase delay to light incident on that phase modulating element. An array of phase modulating elements, such as a Liquid Crystal On Silicon (LCOS) SLM, may therefore represent (or "display") a computationally-determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase delay may be quantised. That is, each pixel may be set at one of a discrete number of phase levels.

The phase-delay distribution may be applied to an incident light wave (by illuminating the LCOS SLM, for example) and reconstructed. The position of the reconstruction in space may be controlled by using an optical Fourier transform lens, to form the holographic reconstruction, or "image", in the spatial domain. Alternatively, no Fourier transform lens may be needed if the reconstruction takes place in the far-field.

A computer-generated hologram may be calculated in a number of ways, including using algorithms such as Gerchberg-Saxton. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only holographic representation of an object in the Fourier domain may be calculated.

The holographic reconstruction may be formed by illuminating the Fourier domain hologram and performing an optical Fourier transform, using a Fourier transform lens, for example, to form an image (holographic reconstruction) at a reply field such as on a screen.

FIG. 1 shows an example of using a reflective SLM, such as a LCOS-SLM, to produce a holographic reconstruction at a replay field location, in accordance with the present disclosure.

A light source (110), for example a laser or laser diode, is disposed to illuminate the SLM (140) via a collimating lens (111). The collimating lens causes a generally planar wavefront of light to become incident on the SLM. The direction of the wavefront is slightly off-normal (e.g. two or three degrees away from being truly orthogonal to the plane of the transparent layer). The arrangement is such that light from the light source is reflected off a mirrored rear surface of the SLM and interacts with a phase-modulating layer to form an exiting wavefront (112). The exiting wavefront (112) is applied to optics including a Fourier transform lens (120), having its focus at a screen (125).

The Fourier transform lens (120) receives a beam of phase-modulated light exiting from the SLM and performs a frequency-space transformation to produce a holographic reconstruction at the screen (125) in the spatial domain.

In this process, the light—in the case of an image projection system, the visible light—from the light source is distributed across the SLM (140), and across the phase modulating layer (i.e. the array of phase modulating elements). Light exiting the phase-modulating layer may be distributed across the replay field. Each pixel of the hologram contributes to the replay image as a whole. That is, there is not a one-to-one correlation between specific points on the replay image and specific phase-modulating elements.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

A holographic projector may be provided using such technology. Such projectors have found application in head-up displays for vehicles.

The use of head-up displays in automobiles is becoming increasing popular. Head-up displays are broken down in to two main categories, those which use a combiner (a free standing glass screen whose purpose is to reflect a virtual image in to the driver's line of sight) and those which utilise the vehicle's windscreen to achieve the same purpose.

FIG. 2 shows an example head-up display comprising a light source 206, a spatial light modulator 204 arranged to spatially modulate light from the light source with holographic data representative of an image for projection, a Fourier transform optic 205, a diffuser 203, a freeform mirror 201, a windscreen 202 and a viewing position 207. FIG. 2 shows a so called "indirect view" system in which a real image of the holographic reconstruction is formed at a replay field on the diffuser 203. A holographic reconstruction is therefore projected on the diffuser 203 and may be viewed from viewing position 207 by focusing on the diffuser 203. The projected image is viewed via a first reflection off freeform mirror 201 and a second reflection off windscreen 202. The diffuser acts to increase the numerical aperture of the holographic system, fully illuminating the freeform mirrors thereby allowing the virtual image to be viewed by a driver, for example.

Such display systems need to use a fixed diffuser or similar component to increase the viewing angle. This diffuser serves as a key component in the imaging system; its distance from the projection optic (normally a freeform mirror) determines the virtual image distance from the viewer's eye.

Alternatively, the holographic reconstruction may be viewed directly. Using "direct view" holography does enable information to be presented in 3D, however as the name suggests direct view requires the viewer to look at the hologram directly without a diffuser between the viewer and the light source. This type of 3D display has a number of problems, firstly the current generation of phase modulators have a relatively small diffraction angle and therefore to create a sufficiently large viewing area (eye-box) requires the use of complex and expensive optics parts. Secondly and more importantly, this type of configuration required the viewer to be directly exposed to laser radiation. There are very strict regulations surrounding the use of lasers and providing a sufficiently robust safety system that will ensure that the eye is never exposed to dangerous levels to laser radiation significantly increases the system complexity.

The use of a diffuser between the viewer and the projection engine mitigates both of the issues highlighted above and therefore a method whereby a diffuser could be employed in a display that offers multiple virtual distances would offer a significant advantage.

The most obvious way to provide "depth" in a direct view system would be to mount the diffuser on a linear stage that was able to move backwards and forwards within the focal length of the virtual imaging optic, thereby offering a mechanism to alter the virtual distance. However this type of system is undesirable for use in a vehicle where build time installed components are expected to offer a lifetime in excess of 10,000 h. Additionally, a non-laser based projection engine would need to be able to refocus upon the diffuser as it changes location, adding additional cost and complexity to the system The present disclosure aims to provide a safe and robust viewing system in which the perceived depth of the information being displayed may be varied.

SUMMARY OF THE INVENTION

Aspects of an invention are defined in the appended independent claims.

There is disclosed a viewing device utilising a plurality of diffusers and a controller arranged to determine which one of the plurality of diffusers displays an object. In embodiments, the object is projected onto the chosen diffuser. In embodiments, the diffusers are liquid crystal devices which are switchable between a transmissive state in which they are effectively transparent to the projected light and a scattering state in which they display the object. In the scattering state, the diffuser acts like a screen.

Embodiments described a device in which an object is projected onto a plurality or array of diffusers but the object is only visible on one of the diffusers. Each diffuser is independently controlled to operate in either a display (e.g. scattering) mode or a non-display (e.g. transparent) mode by, for example, controlling the voltage applied to the diffuser. Optionally, the plurality of diffusers are closely-spaced or stacked. Notably, the diffusers are different distances from the virtual imaging optic.

In an advantageous embodiment, the object is a holographic reconstruction projected using a holographic projector in which programmable phase only lens data is applied to the holographic data to effectively move the focal plane of the holographic reconstruction. Accordingly, small adjustments to focus may be easy made to compensation for the different spatial positions of the plurality of diffusers.

Accordingly, a means for ensuring the object is focused, regardless of which diffuser is activated for display, is provided.

Although embodiments describe "diffusers", it may be understood that in examples, the disclosed diffusers are operated in a non-diffusive mode such as a transmissive mode. The diffusers may be considered as elements with a selectable diffuse state or mode.

BRIEF DESCRIPTION OF THE DRAWINGS

Embodiments will now be described to the accompanying drawings in which.

In the drawings, like reference numerals referred to like parts.

DETAILED DESCRIPTION OF THE DRAWINGS

The present disclosure relates to an improved so-called "indirect view" system in which a viewer views a virtual image of a holographic reconstruction. However, the disclosed indirect view system is equally suitable for indirectly viewing any type of object visible on a diffuser. That is, although embodiments describe indirect view of a holographic reconstruction, the indirectly viewed "object" need not necessarily be a holographic reconstruction. In other words, the present disclosure is equally applicable to other display systems such as more conventional LED backlit liquid crystal display projectors and the like. Embodiments describe a method of computer-generating a hologram by way of example only.

Holographically-generated 2D images are known to possess significant advantages over their conventionally-projected counterparts, especially in terms of definition and efficiency.

Modified algorithms based on Gerchberg-Saxton have been developed—see, for example, co-pending published PCT application WO 2007/131650 incorporated herein by reference.

Figure 1:
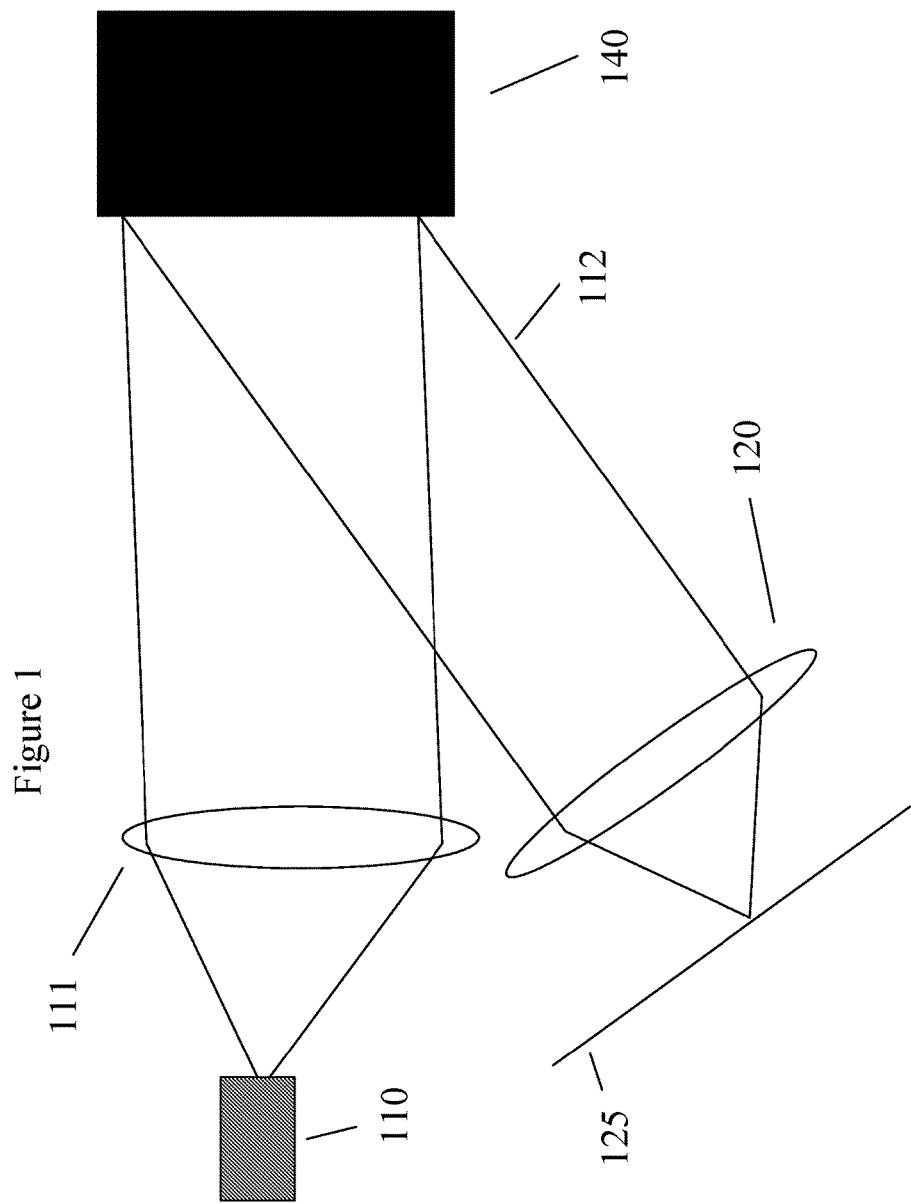
FIG. 1 is a schematic showing a reflective SLM, such as a LCOS, arranged to produce a holographic reconstruction at a replay field location.
Figure 2:
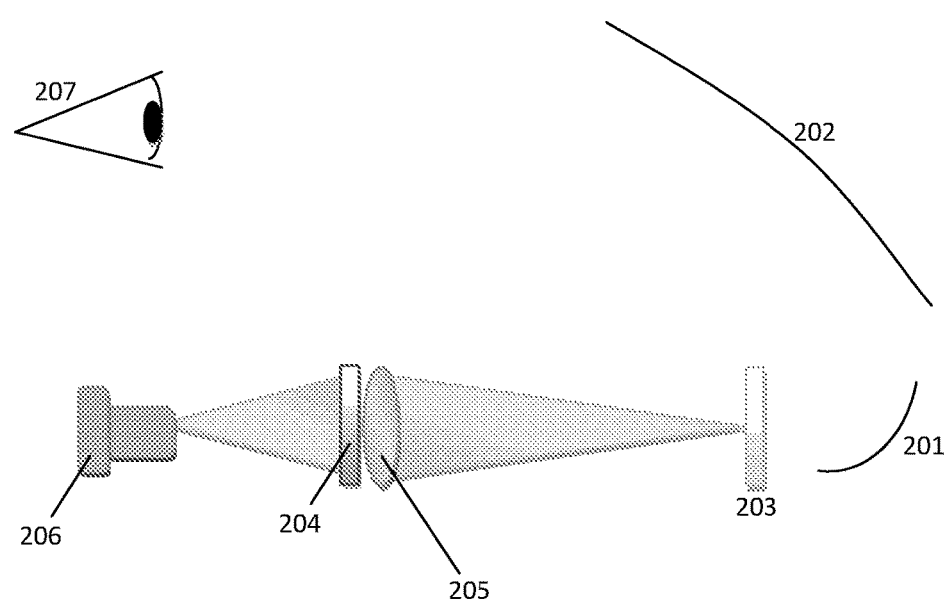
FIG. 2 shows a so-called "indirect view" holographic projector for a head-up display of a vehicle.
Figure 3:
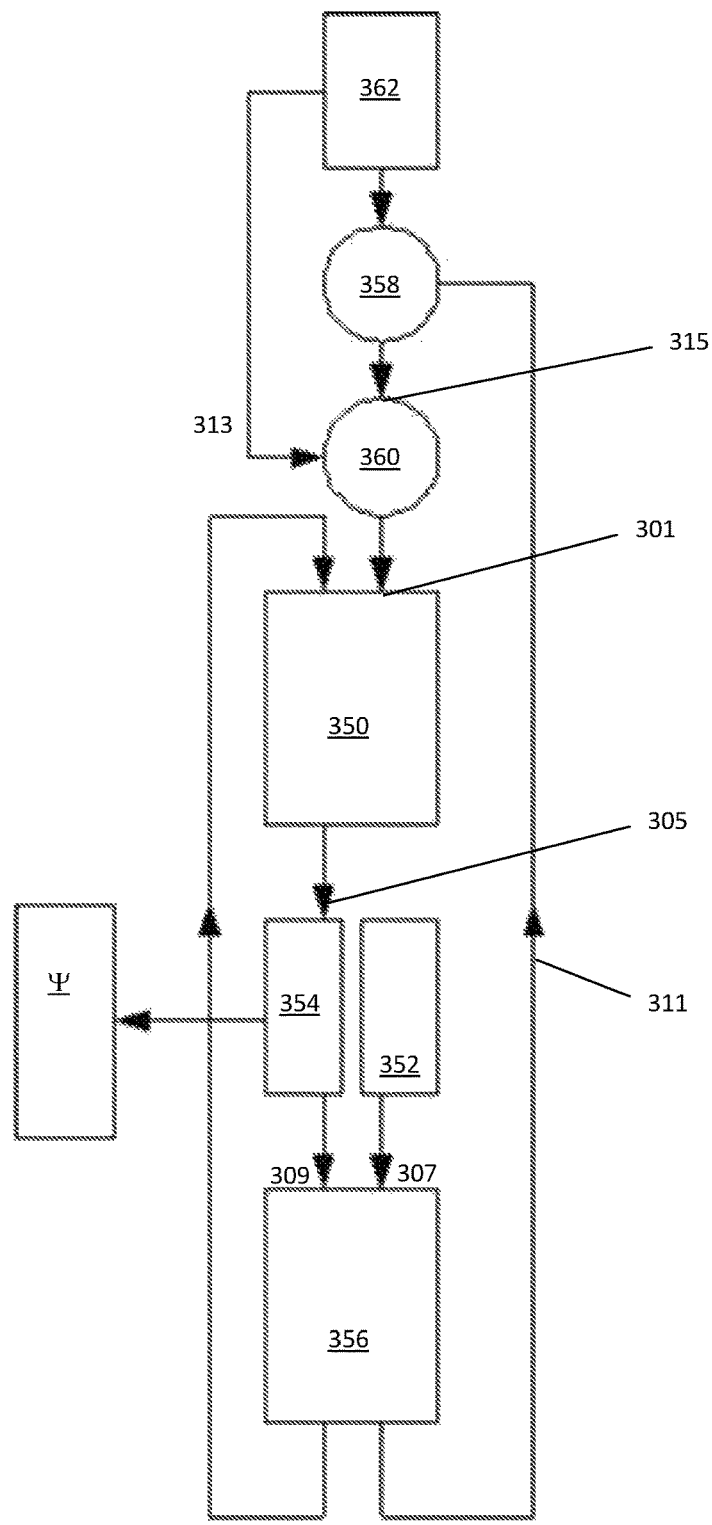
FIG. 3 shows an example algorithm for computer-generating a phase-only hologram.

FIG. 3 shows a modified algorithm which retrieves the phase information $\psi[u,v]$ of the Fourier transform of the data set which gives rise to a known amplitude information $T[x,y]$ 362. Amplitude information $T[x,y]$ 362 is representative of a target image (e.g. a photograph). The phase information $\psi[u,v]$ is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provide feedback on both the amplitude and the phase information.

The algorithm shown in FIG. 3 can be considered as having a complex wave input (having amplitude information 301 and phase information 303) and a complex wave output (also having amplitude information 311 and phase information 313). For the purpose of this description, the amplitude and phase information are considered separately although they are intrinsically combined to form a data set. It should be remembered that both the amplitude and phase information are themselves functions of the spatial coordinates (x,y) for the farfield image and (u,v) for the hologram, both can be considered amplitude and phase distributions.

Referring to FIG. 3, processing block 350 produces a Fourier transform from a first data set having magnitude information 301 and phase information 303. The result is a second data set, having magnitude information and phase information $\psi n[u,v]$ 305. The amplitude information from processing block 350 is set to a distribution representative of the light source but the phase information $\psi_n[u,v]$ 305 is retained. Phase information 305 is quantised by processing block 354 and output as phase information $\psi[u,v]$ 309. Phase information 309 is passed to processing block 356 and combined with the new magnitude by processing block 352. The third data set 307, 309 is applied to processing block 356 which performs an inverse Fourier transform. This produces a fourth data set $R_n[x,y]$ in the spatial domain having amplitude information 311 and phase information 313.

Starting with the fourth data set, its phase information 313 forms the phase information of a fifth data set, applied as the first data set of the next iteration 303'. Its amplitude information $R_n[x,y]$ 311 is modified by subtraction from amplitude information $T[x,y]$ 362 from the target image to produce an amplitude information 315 set. Scaled amplitude information 315 (scaled by $\alpha$) is subtracted from target amplitude information $T[x,y]$ 362 to produce input amplitude information $\eta[x,y]$ 301 of the fifth data set for application as first data set to the next iteration. This is expressed mathematically in the following equations:

$$R_{n+1}[x, y] = F'\{\exp(i\psi_n[u, v])\}$$

$$\psi_n[u, v] = \angle F\{\eta \cdot \exp(i\angle R_n[x, y])\}$$

$$\eta = T[x, y] - \alpha(|R_n[x, y]| - T[x, y])$$

Where:
F' is the inverse Fourier transform;
F if the forward Fourier transform;
R is the replay field;
T is the target image;
$\angle$ is the angular information;
$\Psi$ is the quantized version of the angular information;
$\varepsilon$ is the new target magnitude, $\varepsilon \geq 0$; and
$\alpha$ is a gain element ~1.

The gain element a may be predetermined based on the size and rate of the incoming target image data.

Figure 4:
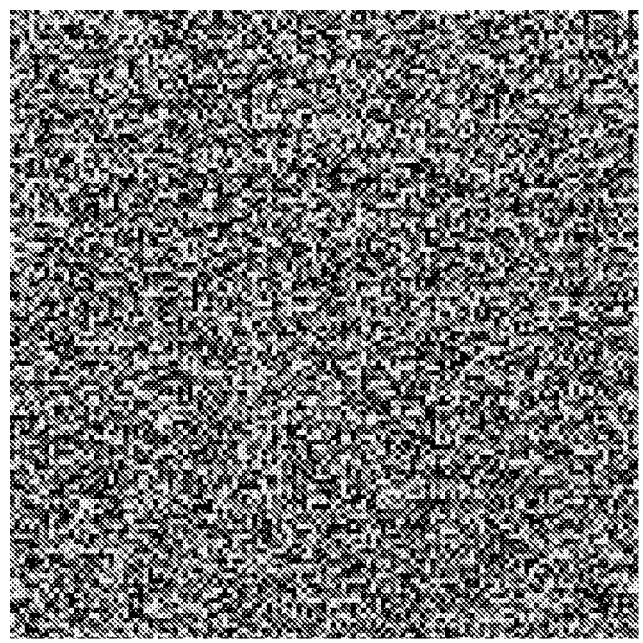
FIG. 4 shows an example random phase seed for the example algorithm of FIG. 3.

In the absence of phase information from the preceding iteration, the first iteration of the algorithm uses a random phase generator to supply random phase information as a starting point. FIG. 4 shows an example random phase seed.

In a modification, the resultant amplitude information from processing block 350 is not discarded. The target amplitude information 362 is subtracted from amplitude information to produce a new amplitude information. A multiple of amplitude information is subtracted from amplitude information 362 to produce the input amplitude information for processing block 356. Further alternatively, the phase is not fed back in full and only a portion proportion to its change over the last two iterations is fed back. Accordingly, Fourier domain data representative of an image of interest may be formed.

In summary, there is provided an improved imaging device comprising a plurality of controllable diffusers or selectively-diffusive elements. The diffusers are controlled such that an image is visible on only one of the diffusers at any one point in time. By using a virtual projection lens and positioning the diffusers at different distances from a virtual projection optic, a variable position virtual image is formed.

Figure 5:
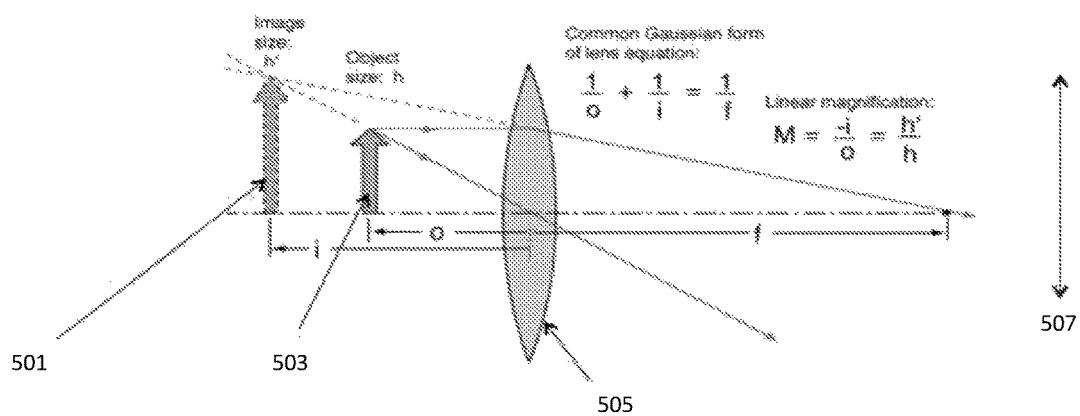
FIG. 5 is a virtual imaging schematic.

FIG. 5 shows an embodiment of the present disclosure in which a virtual projection optic 505 forms a virtual image 501 of an object 503. The object 503 is visible on a diffuser. The virtual image 501 is seen from observation plane 507.

The virtual image distance is set by placing the object inside the focal length of the imaging optic, the apparent virtual distance may then be calculated.

For the optical schematic shown above, the virtual image distance (i) is determined by the following equation:

$$i = \frac{1}{\frac{1}{f} - \frac{1}{o}} \tag{1}$$

A linear change in the object distance causes a non-linear change in the virtual distance.

The virtual image has to be sufficiently far from the eye so that the eye refocusing time from infinity, which is the normal focal length when driving, to the display information is small thereby reducing the blind flight time. However, the virtual image distance must also be sufficiently close so that the information presented to the driver is clearly legible. These two competing factors normally result in the virtual image distance being configured such that the essential driving information is presented at a distance of 1.5 to 3.5 m, optionally 2.5 m, from the driver's eye.

The present disclosure provides a viewing device comprising a plurality of diffusers and a controller arranged to control which diffuser the image is visible on.

Figure 6:
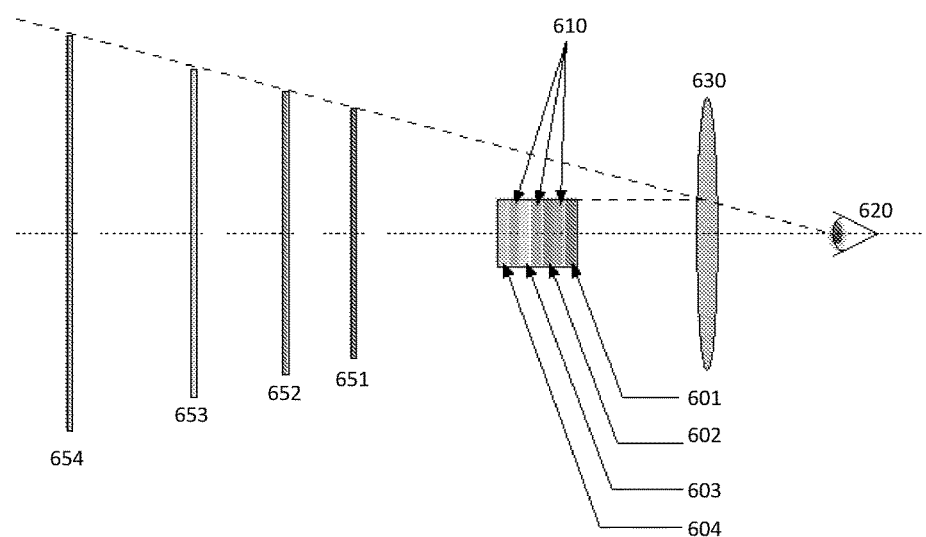
FIG. 6 is multi-diffuser schematic in accordance with the present disclosure.

FIG. 6 shows an embodiment of the present disclosure in which the distance from the viewer 620 to the virtual image 651, 652, 653, 654, formed by virtual projection optic 630, is changed by selecting which diffuser 601, 602, 603, 604 the image is visible on. In this embodiment, diffusers 601, 602, 603, 604 are substantially parallel and stacked together. In this embodiment, the diffusers are spaced by glass substrate 610. If the image is visible on diffuser 601, the virtual image 651 will appear at a first depth to viewer 620. If the image is visible on diffuser 602, the virtual image 652 will appear at a second depth to viewer 620, and so on.

There is therefore provided an imaging device comprising: a projection optic arranged to form a virtual image of a real image; a first diffuser positioned a first distance from the virtual projection optic; a second diffuser positioned a second distance from the virtual projection optic; and a controller arranged to control the first and second diffusers to make the real image visible on one of the diffusers. That is, the controller is arranged to control which diffuser the real image is visible on.

Accordingly, the effective position of the virtual image may be changed by selected which diffuser the real image is visible, or "displayed", on.

There is also provided a method of moving a virtual image using a plurality of diffusers, the method comprising: forming a virtual image of a real image visible on a diffuser using a projection optic; controlling whether the real image is visible on a first diffuser positioned a first distance from the projection optic or a second diffuser positioned a second distance from the projection optic.

In an embodiment, the real image is a holographic reconstruction but as previously described, the real image may be projected onto the diffuser/s by any means.

In an embodiment, each diffuser is independently switchable between a scattering mode and a transmissive mode. A diffuser operating in the transmissive mode will transmit the projected object but a diffuser operating in the scattering mode will effectively "display" the object. That is, the (real) image will be visible on the diffuser operating in the scattering mode. By stacking a plurality of diffusers together and arranging them such that each is at a different distance from the virtual projection optic, the parameter "o" in equation 1 may be varied. Accordingly, the distance from the observation plane to the viewed virtual image is changed. It may therefore be understood that the perceived depth of the displayed information may be changed by selecting the diffuser.

In an embodiment, the controller is arranged to operate no more than one diffuser in the scattering mode at any one point in time. That is, one diffuser is operated in the scattering mode and all other diffusers are operated in the transmissive mode.

In an embodiment, to enable an eye safe, low complexity, variable distance head up display, liquid crystal devices are used that can switch between a scattering and transmissive state. That is, in an embodiment, the first and/or second diffusers comprise liquid crystals in which a light scattering state may be selectively-induced.

By sandwiching a number of these devices together the effective position of the diffuser may be simply by choosing which device to energise in to a scattering state.

Light scattering states can be induced in thin liquid crystal layers by a number of mechanisms. In each case the refractive index of the liquid crystal varies from point to point with a magnitude and spatial frequency sufficiently close to the wavelength of light so as to result in strong scattering.

Some of these liquid crystal electro-optic effects are static and some are dynamic (consisting of turbulent motion). The static effects may be transient (only present when a voltage is maintained), bistable (a single scattering state that can be switched on and off with a voltage pulse) or multistable (a number of different stable scattering states that can be switched on and off with voltage pulses. That is, in an embodiment, the scattering state is selectively-induced by voltage.

Embodiments use liquid crystals selected from the group comprising:

(1) Cholesteric liquid crystals (also called chiral nematic phases) with a suitably small cholesteric pitch can be driven into transparent and light scattering states by dielectric re-orientation. Polymer materials may be added to these materials to stabilise the textures. The textures are static and can exhibit bi-stability, (but not multi-stability). For more information concerning this type of liquid crystal, the reader is referred to Gruebel. W., U. Wolff., and H. Kruber., "Electric field induce texture changes in certain nematical cholesteric liquid crystal mixtures"., Mol. Cryst. Liq. Cryst, Vol. 24, 1973, pp 103-109 and V. G. Chigrinov, "Liquid Crystal devices, Physics and Applications", ISBN 0-89006-895-4, Published by Artech House, 1999, pp 134-148.

(2) Films of nematic liquid droplets in a polymer matrix (polymer dispersed liquid crystal or "PDLCs") can exhibit light scattering and can be switched into a clear state by dielectric re-orientation. This is a static texture and relaxes back to a clear state on removal of the drive voltage, i.e. PDLCs are not usually bi-stable. Some bi-stability can be induced by using a chiral nematic liquid crystal (i.e. a cholesteric liquid crystal) instead of the nematic phase in the droplets. For more information concerning this type of liquid crystal, the reader is referred to Coates D., "Polymer dispersed Liquid Crystals", J. Mater. Chem., Vol. 5, No. 12., 1994, pp 2063-2072 and Doane, J. W., et al., "Wide-angle View PDLC Displays". SID '90 Digest, 1990, pp 224-226.

(3) Dynamic scattering can also be electro-chemically induced in the liquid crystal smectic A phase, which are more ordered that nematic phases. The application of a low frequency voltage produces a turbulent dynamic scattering state resembling that occurring in nematic liquid crystals. However when the voltage is removed, the scattering state does not relax back to clear state, but remains as a semi-permanent static texture. It can however then be removed by applying a higher frequency voltage (>1 KHz). This scattering state is 'multi-stable' in that different degrees of scattering can be induced and they are all stable in the absence of voltage. High voltages (around 100 V) are required for smectic dynamic scattering. For more information concerning this type of liquid crystal, the reader is referred to: D. Coates, W. A. Crossland, J. H. Morrissy, and B. Needham, J. Phys. D. 11, 1 (1978); and Crossland W. A., Davey A. B., Chu D., Clapp T. V., "Smectic A Memory Displays", in Handbook of Liquid Crystals: 7 Volume Set, Second Edition. Edited by J. W. Goodby, P. J. Collings, T. Kato, C. Tschierske, H. Gleeson, and P. Raynes. . Published 2013 by Wiley-VCH Verlag GmbH & Co. KGaA. Chapter 7, pp 1-39.

The inventors have identified which of these liquid crystals are suitable in accordance with the present disclosure. These possibilities are summarised in the table below.

TABLE 1

|  | Switchable diffusers | Bi-stability of scattering state | Multi-stability of scattering state |
| --- | --- | --- | --- |
| Cholesteric liquid crystals | Yes | Yes | No |
| PDLCs | Yes | Possible | No |
| Smectic dynamic scattering | Yes | Yes | Yes |

In an embodiment, the first and/or second diffusers comprise cholesteric liquid crystals. In another embodiment, the first and/or second diffusers comprise polymer dispersed liquid crystals. In a further embodiment, the first and/or second diffusers comprise smectic-A liquid crystals.

As shown in FIG. 6, in an embodiment, the first and second diffuser are substantially parallel and/or positioned on a common optical axis.

Although FIG. 6 shows an arrangement of four diffusers, it may be understand that any number of diffusers may be employed depending on the resolution required. That is, in an embodiment, the device further comprises a plurality of further diffusers positioned at different distances from the projection optic. All the diffusers may be substantially parallel and/or positioned on a common optical axis. In an embodiment, the diffusers are on a common optical axis with the virtual projection optic.

In an optional embodiment, an image is visible on the chosen diffuser because the diffusor is scattering and the image is projected onto the diffuser by a projector. In an embodiment, the image is projected onto the diffuser by a holographic projector and the object is a holographic reconstruction of a predetermined object. An example holographic projector has been previous described in, for example, WO 2013/153354 incorporated herein by reference.

In an embodiment, there is therefore provided a display system comprising the previous described imaging device and a holographic projector comprising a spatial light modulator arranged to apply a phase-delay distribution to incident light, wherein the phase-delay distribution comprises phase-only data representative of a lens and phase-only data representative of the object.

It is known in the art how a phase-only programmable lens may be combined with phase-only object data such that, when reconstructed by reverse Fourier transform (e.g. optically), a focused holographic reconstruction is formed at a chosen depth of replay field. In embodiments, the data is combined by simple vector addition.

In an embodiment, the holographic projector therefore further comprises a Fourier transform optic arranged to perform an optical Fourier transform of phase modulated light received from the spatial light modulator to form the object.

The disclosed method of moving a virtual image may therefore further comprise: applying a phase-delay distribution to incident light wherein the phase-delay distribution comprises phase-only data representative of a lens and phase-only data representative of the object; performing an optical Fourier transform of phase modulated light received from a spatial light modulator to form the object; and selecting the focal length of the Fresnel lens so that the image is substantially focused on the diffuser on which the image is visible.

As the diffusion plane may be changed, the distance from the projection system will also have changed, this may defocus and therefore degrade the quality of the displayed image. However, advantageously, where the above system in employed in conjunction with the phase only holographic projector, this problem is overcome by combining the hologram with a phase only representation of an appropriate focal length lens. In non-laser based systems an adjustable autofocus may need to be employed adding complexity to the projection engine.

That is, in an advantageous embodiment, the holographic projector is further arranged to select the focal length of the phase only lens so that the image is substantially focused on the diffuser on which the image is visible.

In a further embodiment, the Fourier transform optic utilised by the holographic projector is not a physical optic but, instead, a further phase only lens implemented using the same holographic techniques.

In embodiment, the display system is a head-up display although it may be understood the disclosed imaging device is equally applicable to other display systems and projection systems.

Example System

The system outlined in FIG. 6, shows a system with four liquid crystal diffusers, separated by glass windows. For a system employing a virtual imaging lens with 200 mm back focal length and 5 mm thick window separating each of the switchable diffusers, the following virtual distances would be possible.

TABLE 2

| Diffuser | Diffuser location | Virtual image distance |
| --- | --- | --- |
| 1 | 181 mm | 2.02 m |
| 2 | 187 mm | 2.88 m |
| 3 | 192 mm | 4.80 m |
| 4 | 197 mm | 13.13 m |

Although examples show four diffusers linearly spaced, the spacing could be non-linear, and the number of diffusers could be altered depending upon the desired distance resolution.

Advantageously, the manufacture and assembly of these liquid crystal diffusers is low cost, due to the absence of pixelated circuitry and the associated drivers, that the use of multiple diffusers in a package would not be cost prohibitive.

It can be understood that a head-up display may display a variety of information as known in the art. Holograms corresponding to all the possible displays may be therefore be pre-calculated and stored in a repository, or calculated in real-time. In an embodiment, the projector further comprises a repository of Fourier domain data representative of a plurality of 2D images.

Embodiments described herein relate to Fourier holography by way of example only. The present disclosure is equally applicable to Fresnel holography in which Fresnel transform is applied during calculation of the hologram.

The quality of the reconstructed hologram may be affect by the so-called zero order problem which is a consequence of the diffractive nature of the reconstruction. Such zero-order light can be regarded as "noise" and includes for example specularly reflected light, and other unwanted light from the SLM.

This "noise" is generally focussed at the focal point of the Fourier lens, leading to a bright spot at the centre of a reconstructed hologram. Conventionally, the zero order light is simply blocked out however this would clearly mean replacing the bright spot with a dark spot.

Alternatively and angularly selective filter could be used to remove only the collimated rays of the zero order. Other methods of managing the zero order may also be used.

Whilst embodiments described herein relate to displaying one hologram per frame, the present disclosure is by no means limited in this respect and more than one hologram may be displayed on the SLM at any one time.

For example, embodiments implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zeroth diffraction order, and it is preferred that the first and subsequent orders are displaced far enough so as not to overlap with the image and may be blocked by way of a spatial filter.

As mentioned above, the image produced by this method (whether with tiling or without) comprises spots that form image pixels. The higher the number of tiles used, the smaller these spots become. If one takes the example of a Fourier transform of an infinite sine wave, a single frequency is produced. This is the optimum output. In practice, if just one tile is used, this corresponds to an input of a single cycle of a sine wave, with a zero values extending in the positive and negative directions from the end nodes of the sine wave to infinity. Instead of a single frequency being produced from its Fourier transform, the principle frequency component is produced with a series of adjacent frequency components on either side of it. The use of tiling reduces the magnitude of these adjacent frequency components and as a direct result of this, less interference (constructive or destructive) occurs between adjacent image pixels, thereby improving the image quality.

Preferably, each tile is a whole tile, although it is possible to use fractions of a tile.

Embodiments relate to variants of the Gerchberg-Saxton algorithm by way of example only.

The skilled person will understand that the improved method disclosed herein is equally applicable to the calculation of a hologram used to form a three-dimensional reconstruction of an object.

Equally, the present disclosure is not limited to projection of a monochromatic image.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An alternative method, that will be referred to as "spatially separated colours" (SSC) involves all three lasers being fired at the same time, but taking different optical paths, e.g. each using a different SLM, or different area of a single SLM, and then combining to form the colour image.

An advantage of the frame-sequential colour (FSC) method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC (spatially separated colours) method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced.

In embodiments, the SLM is a Liquid Crystal over silicon (LCOS) device. LCOS SLMs have the advantage that the signal lines, gate lines and transistors are below the mirrored surface, which results in high fill factors (typically greater than 90%) and high resolutions.

LCOS devices are now available with pixels between 2.5 μm and 15 μm.

Figure 7:
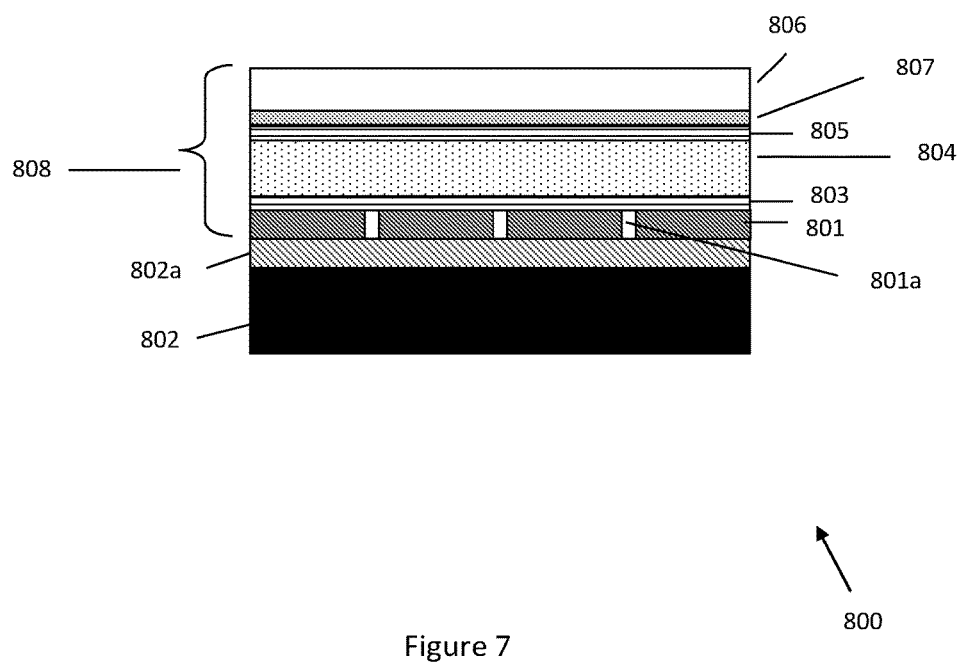
FIG. 7 is a schematic of a LCOS SLM.

The structure of an LCOS device is shown in FIG. 7.

An LCOS device is formed using a single crystal silicon substrate (802). It has a 2D array of square planar aluminium electrodes (801), spaced apart by a gap (801*a*), arranged on the upper surface of the substrate. Each of the electrodes (801) can be addressed via circuitry (802*a*) buried in the substrate (802). Each of the electrodes forms a respective planar mirror. An alignment layer (803) is disposed on the array of electrodes, and a liquid crystal layer (804) is disposed on the alignment layer (803). A second alignment layer (805) is disposed on the liquid crystal layer (404) and a planar transparent layer (806), e.g. of glass, is disposed on the second alignment layer (805). A single transparent electrode (807) e.g. of ITO is disposed between the transparent layer (806) and the second alignment layer (805).

Each of the square electrodes (801) defines, together with the overlying region of the transparent electrode (807) and the intervening liquid crystal material, a controllable phase-modulating element (808), often referred to as a pixel. The effective pixel area, or fill factor, is the percentage of the total pixel which is optically active, taking into account the space between pixels (801*a*). By control of the voltage applied to each electrode (801) with respect to the transparent electrode (807), the properties of the liquid crystal material of the respective phase modulating element may be varied, thereby to provide a variable delay to light incident thereon. The effect is to provide phase-only modulation to the wavefront, i.e. no amplitude effect occurs. A major advantage of using a reflective LCOS spatial light modulator is that the liquid crystal layer can be half the thickness than would be necessary if a transmissive device were used. This greatly improves the switching speed of the liquid crystal (a key point for projection of moving video images). A LCOS device is also uniquely capable of displaying large arrays of phase only elements in a small aperture. Small elements (typically approximately 10 microns or smaller) result in a practical diffraction angle (a few degrees) so that the optical system does not require a very long optical path.

It is easier to adequately illuminate the small aperture (a few square centimetres) of a LCOS SLM than it would be for the aperture of a larger liquid crystal device. LCOS SLMs also have a large aperture ratio, there being very little dead space between the pixels (as the circuitry to drive them is buried under the mirrors). This is an important issue to lowering the optical noise in the replay field.

Using a silicon backplane has the advantage that the pixels are optically flat, which is important for a phase modulating device.

Whilst embodiments relate to a reflective LCOS SLM, the skilled person will understand that any SLM can be used including transmissive SLMs.

The invention is not restricted to the described embodiments but extends to the full scope of the appended claims.

The invention claimed is:

1. A display system comprising:
    a holographic projector arranged to project a two-dimensional real image of an object, the holographic projector comprising a spatial light modulator arranged to apply a phase-delay distribution to incident light, wherein the phase-delay distribution comprises phase data representative of a lens and phase data representative of the object, the real image being a holographic reconstruction resulting from the phase-delay distribution applied to the incident light; and
    an imaging device, comprising:
        a virtual image projection optic;
        a first diffuser and a second diffuser positioned in series along an optical axis from the holographic projector to the virtual image projection optic, the first diffuser being positioned a first distance from the virtual image projection optic, the second diffuser being positioned a second distance from the virtual image projection optic, the first distance being different from the second distance; and
        a controller arranged to control the first and second diffusers to make the real image visible on only one of the first and second diffusers, the holographic projector being configured to project the real image on either of the first and second diffusers,
    wherein the virtual image projection optic is positioned along an optical axis between the first and second diffusers and a viewing plane, the virtual image projection optic being arranged to form a virtual image of a real image formed on either of the first diffuser and the second diffuser, the virtual image having a substantially different virtual distance from the viewing plane as observed by a user when the real image is visible on the first diffuser as compared to when the real image is visible on the second diffuser.

2. The display system of claim 1, wherein each diffuser is independently switchable between a scattering mode and a transmissive mode.

3. The display system of claim 2, wherein the controller is arranged to operate no more than one diffuser in the scattering mode at any one point in time.

4. The display system of claim 1, wherein at least one of the first or second diffusers comprises liquid crystals in which a light scattering state may be selectively-induced.

5. The display system of claim 4, wherein the scattering state is selectively-induced by voltage.

6. The display system of claim 1, wherein at least one of the first or second diffusers comprises cholesteric liquid crystals.

7. The display system of claim 1, wherein at least one of the first or second diffusers comprises polymer dispersed liquid crystals.

8. The display system of claim 1, wherein at least one of the first or second diffusers comprises smectic-A liquid crystals.

9. The display system of claim 1, wherein the first and second diffusers are substantially parallel.

10. The display system of claim 1, further comprising a plurality of further diffusers positioned at different distances from the virtual image projection optic.

11. The display system of claim 1, wherein the holographic projector further comprises a Fourier transform optic arranged to perform an optical Fourier transform of phase modulated light received from the spatial light modulator to form the real image.

12. The display system of claim 1, wherein the holographic projector is further arranged to select the focal length of the lens so that the real image is substantially focused on the first diffuser when the real image is visible on the first diffuser, and that the real image is substantially focused on the second diffuser when the real image is visible on the second diffuser.

13. The display system of claim 1, wherein the display system is a head-up display.

14. The display system of claim 1, installed in a vehicle with the user being the driver of the vehicle, and is configured to form the virtual image at a distance between 1.5 m and 3.5 m from a driver's eye.

15. The display system as claimed in claim 1, configured such that the virtual distance observed by the user when the real image is visible on the first diffuser is at least 0.86 m different than the virtual distance observed by the user when the real image is visible on the second diffuser.

16. The display system as claimed in claim 1, configured such that the virtual distance observed by the user when the real image is visible on the first diffuser is at least 2.78 m different than the virtual distance observed by the user when the real image is visible on the second diffuser.

17. A method of changing the apparent depth of a virtual image of an object as observed by a user using a plurality of diffusers, the method comprising:
    using a phase-only spatial light modulator, applying a first phase-delay distribution to incident light wherein the phase-delay distribution comprises phase data representative of a first lens and phase data representative of the object to form phase-modulated light;
    performing an optical Fourier transform of the phase modulated light from the spatial light modulator to form a real image of the object on a first diffuser, the real image being visible on the first diffuser but not on the second diffuser; and forming a virtual image of the real image visible on the first diffuser of the plurality of diffusers using a virtual image projection optic, the first diffuser being a first distance from the virtual image projection optic; and then using a phase-only spatial light modulator, applying a second phase-delay distribution to incident light wherein the phase-delay distribution comprises phase data representative of a second lens and phase data representative of the object to form phase-modulated light;

performing an optical Fourier transform of the phase-modulated light from the spatial light modulator to form a real image of the object on a second diffuser of the plurality of diffusers, the real image being visible on the second diffuser but not on the first diffuser, the second diffuser being a second distance from the virtual image projection optic, the first distance being different from the second distance; and forming a virtual image of the real image visible on the second diffuser, wherein the virtual image projection optic is positioned along an optical axis between the first and second diffusers and a viewing plane, the virtual image having a substantially different virtual distance from the viewing plane as observed by a user when the real image is visible on the first diffuser as compared to when the real image is visible on the second diffuser.

18. The method of claim 17, wherein in each of the first phase-delay distribution and the second phase delay distribution, the focal length of the lens is selected so that the real image is substantially focused on the first diffuser when the real image is visible on the first diffuser, and that the real image is substantially focused on the second diffuser when the real image is visible on the second diffuser.

19. The method as claimed in claim 17, wherein each diffuser is independently switchable between a scattering mode in which an image is visible thereon, and a transmissive mode in which an image is not visible thereon.

20. The method as claimed in claim 19, wherein when the first diffuser is in a scattering mode, the second diffuser is in a transmissive mode; and wherein when the second diffuser is in a scattering mode, the first diffuser is in a transmissive mode.

21. The method as claimed in claim 17, wherein in the first phase-delay distribution the phase data representative of the first lens is selected to bring the real image into substantial focus on the first diffuser, and wherein the phase data representative of the second lens is selected to bring the real image into substantial focus on the first diffuser.

22. The method as claimed in claim 17, wherein the virtual distance observed by the user when the real image is visible on the first diffuser is at least 0.86 m different than the virtual distance observed by the user when the real image is visible on the second diffuser.

23. The method as claimed in claim 17, wherein the virtual distance observed by the user when the real image is visible on the first diffuser is at least 2.78 m different than the virtual distance observed by the user when the real image is visible on the second diffuser.

24. A display system comprising:

a holographic projector arranged to project a two-dimensional real image of an object, the holographic projector comprising a spatial light modulator arranged to apply a phase-delay distribution to incident light, wherein the phase-delay distribution comprises phase data representative of a lens and phase data representative of the object, the real image being a holographic reconstruction resulting from the phase-delay distribution applied to the incident light; and an imaging device, comprising:

a virtual image projection optic having a focal distance;

a first diffuser and a second diffuser positioned in series along an optical axis from the holographic projector to the virtual image projection optic, the first diffuser being positioned a first distance from the virtual image projection optic, the second diffuser being positioned a second distance from the virtual image projection optic, the first distance being different from the second distance; and a controller arranged to control the first and second diffusers to make the real image visible on only one of the first and second diffusers, the holographic projector being configured to project the real image on either of the first and second diffusers, wherein the virtual image projection optic is positioned along an optical axis between the first and second diffusers and a viewing plane, the virtual image projection optic being arranged to form a virtual image of a real image formed on either of the first diffuser and the second diffuser, the virtual image having a substantially different virtual distance from the viewing plane as observed by a user when the real image is visible on the first diffuser as compared to when the real image is visible on the second diffuser, and wherein the first and second diffusers are positioned within the focal distance of the virtual image projection optic.

* * * * *